Patented Oct. 26, 1943

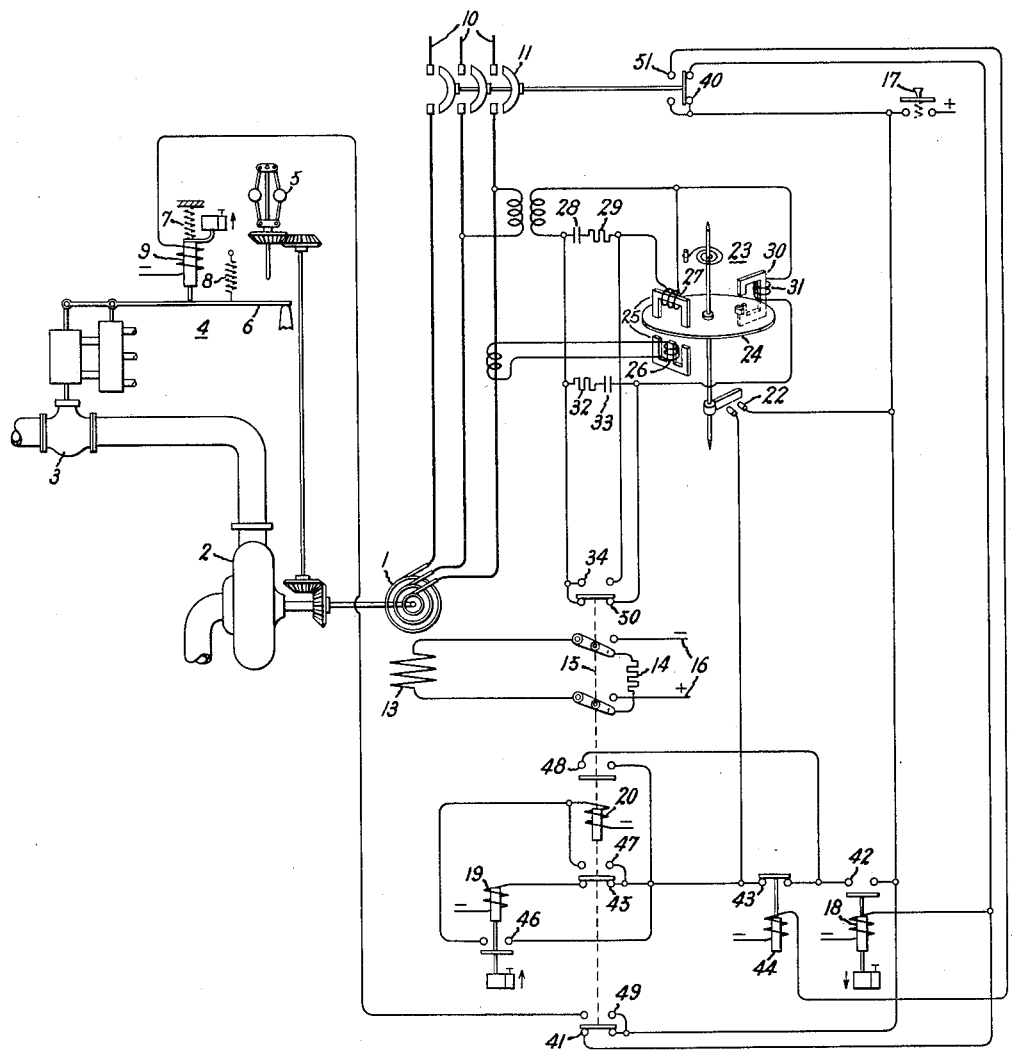
Oct. 26, 1943.  H. BANY  2,332,836
CONTROL EQUIPMENT FOR PRIME MOVER DRIVEN SYNCHRONOUS GENERATORS
Filed Dec. 24, 1942
Inventor:
Herman Bany,
by Harry E. Dunham
His Attorney.

2,332,836

UNITED STATES PATENT OFFICE 2,332,836

CONTROL EQUIPMENT FOR PRIME MOVER DRIVEN SYNCHRONOUS GENERATORS

Herman Bany, Lansdowne, Pa., assignor to General Electric Company, a corporation of New York Application December 24, 1942, Serial No. 469,989

9 Claims. (Cl. 290—4)

My invention relates to control equipments for prime mover driven synchronous generators and particularly to an equipment for controlling the operation of such a generator when it falls out of step, and the object of my invention is to provide an improved arrangement of apparatus for restoring synchronous operation of such a generator as quickly as possible after it falls out of step.

My invention will be better understood from the following description when taken in connection with the accompanying drawing, the single figure of which diagrammatically illustrates a control equipment for a prime mover driven synchronous generator embodying my invention, and its scope will be pointed out in the appended claims.

Referring to the drawing, I represents a synchronous generator driven by a suitable prime mover 2. The supply of driving energy to the prime mover 2 is controlled by a gate 3, the position of which is controlled by a suitable governor 4 which, as shown, includes the fly balls 5 given by the prime mover 2 and arranged to control the position of a movable member 6, which in turn controls the position of the gate 3. As shown, the movable member 6 is in the gate-closed position and is held in that position by a closing spring 7 against the bias of an opening spring 8 as long as a governor magnet 9 is de-energized. When the magnet 9 is energized, it moves the closing spring 7 out of operative relation with the movable member 6 and allows the opening spring 8 to move the movable member 6 to an opening position determined by the position of the fly balls 5.

The generator I is arranged to be connected to an energized alternating current system 10 by a circuit breaker 11 which may be of any suitable type. In order to simplify the disclosure, I have shown the circuit breaker 11 as being of the manually controlled type, but it will be obvious that it may be automatically controlled in any suitable manner.

The generator I is provided with a field winding 13 which is arranged to be short-circuited through a suitable discharge resistor 14 in one position of a two-position field switch 15 and to a suitable source of excitation 16 when the field switch 15 is in its other position.

The prime mover 2 is arranged to be started and stopped in response to the closing and opening of a control switch 17. While I have shown the control switch 17 as being manually controlled, it will be obvious that it may be automatically controlled in various ways, examples of which are well known in the art. The closing of the control switch 17, when either the circuit breaker 11 or the field switch 15 is open, effects the energization of a control relay 18, which in turn effects the energization of another control relay 19 to complete an energizing circuit for the closing coil 20 of the field switch 15 so as to connect the generator field winding 13 to the source of excitation 16. The closing of the field switch 15 also completes an energizing circuit for the governor magnet 9 so as to render the governor 4 operative to start the prime mover 2 from rest and bring it up to the normal operating speed when the circuit breaker 11 is closed to synchronize the generator I with the electric system 10. The closing of the circuit breaker 11 and the field switch 15 changes the connection of the closing coil 20 of the field switch 15 so that thereafter the energization of the closing coil 20 depends upon the position of the contacts 22 of an out-of-step responsive relay 23, which is so connected that the contacts 22 are opened whenever the generator I pulls out of step. United States Patent 2,151,160, granted March 21, 1939, on an application filed by Harold T. Seeley and assigned to the same assignee as this application, discloses an impedance responsive relay which when designed with the proper operating characteristics for use with a generator is particularly adapted for use as an out-of-step responsive relay in the embodiment of my invention shown in the drawing since it responds, just prior to actual pull out, to a predetermined armature circuit of the generator indicative that the generator is about to pull out of step. Such an impedance relay comprises a rotatable member 24 and a cooperating wattmetric driving element 25 that includes a current winding 26 energized in response to the current in one of the phase conductors connected to the armature winding of the generator I and a voltage winding 27 connected in series relation with a capacitor 28 and a resistor 29 across one phase of the armature winding of the generator I. The rotatable member 24, which controls the opening and closing of the contacts 22, is also provided with another driving element 30 which has a voltage winding 31 connected across one phase of the armature circuit of the generator I with a resistor 32 and a capacitor 33 in series therewith. This driving element 30 exerts a torque on the rotatable element 24 in a direction to close the contacts 22. When the field switch 15 is closed, the auxiliary contacts 34 thereof shunt the capacitor 28 and the resistor 29 in the circuit of the voltage winding 27 so that the operating characteristics of the relay 23 is such as to maintain the contacts 22 closed until the power factor of the generator 1 changes to a predetermined leading value which, while the circuit breaker 10 is closed, occurs when the generator is about to pull out of step. When the field switch 15 is open, the auxiliary contacts 50 thereof shunt the resistor 32 and the capacitor 33 in the circuit of the voltage winding 31 so that the operating characteristic of the relay 23 is such that the contacts 22 are closed for a sufficient length of time to effect the operation of the time relay 19 only when the slip of the generator 1 is below a predetermined value.

In accordance with my invention, the opening of the contacts 22 of the out-of-step responsive relay 23, when the generator pulls out of step, effects the opening of the field switch 15 and the deenergization of the governor magnet 9 so as to decrease the supply of driving energy to the prime mover 2. When the speed of the out-of-step generator decreases sufficiently so that the slip of the generator is less than a predetermined value, the relay 23 is arranged to maintain its contacts 22 closed for a sufficient length of time to pick up the time relay 19 and thereby effect the closing of the field switch 15 to pull the generator into synchronism with the system 10. The closing of the field switch 15 also reenergizes the governor magnet 9 so that the amount of driving energy supplied to the prime mover is increased sufficiently to place the prime mover 2 again under the control of the governor 4.

The operation of the arrangement shown in the drawing is as follows: When the prime mover driven generator 1 is shut down, the various control devices are in the positions in which they are shown in the drawing. When it is desired to place the generator 1 in operation, the control switch 17 is closed so as to complete through the parallel-connected contacts 40 on the circuit breaker 11 and the contacts 41 on the field switch 15 an energizing circuit for the control relay 18. The closing of the contacts 42 of the control relay 18 completes through the contact of the control switch 17, the contacts 43 of the control relay 44, and the auxiliary contacts 45 on the field switch 15 an energizing circuit for the time relay 19. After being energized for a predetermined time, the relay 19 closes its contacts 46 and completes through the contacts of the control switch 17, the contacts 42 of the control relay 18, and the contacts 43 of the control relay 44 an energizing circuit for the closing coil 20 so that the field switch 15 is closed to connect the field winding 13 of the generator 1 to the source of excitation 16. The closing of the auxiliary contacts 47 and 48 on the field switch 15 completes shunt circuits around the contacts 46 of the relay 19 and the contacts 43 of the relay 44, respectively, in the energizing circuit of the closing coil 20. The closing of the auxiliary contacts 49 on the field switch 15 completes through the contacts of the control switch 17 an energizing circuit for the governor magnet 9 which then moves the closing spring 7 out of operative relation with the movable member 6 of the governor 4 so that the opening spring 8 moves the member 6 in a direction to effect the opening of the gate 3. As soon as the prime mover 2 has accelerated to a predetermined speed, fly balls 5 operate to limit the opening movement of the member 6 so as to maintain the prime mover 2 and the generator 1 at the desired operating speed. The circuit breaker 11 is then closed in any suitable manner to effect the synchronization of the generator 1 with the system 10.

The closing of the auxiliary contacts 51 on the circuit breaker 11 completes an energizing circuit for the control relay 44, and the opening of the auxiliary contacts 40 on the circuit breaker 11 interrupts the energizing circuit of the control relay 18 which, after being deenergized for a predetermined time, opens the energizing circuit of the closing coil 20 of the field switch 15. However, before the relay 18 opens its contacts 42, the generator pulls into synchronism and the relay 23 operates to close its contacts 22 to complete another holding circuit for the closing coil 20 of the field switch 15 through the contacts of the control switch 17 and the auxiliary contacts 47 on the field switch 15. Therefore, as long as the generator 1 continues to operate in synchronism, the field switch 15 remains closed and the speed of the prime mover 2 is maintained at the desired value by the operation of the governor 4.

When, however, the generator 1 starts to fall out of synchronism, the power factor thereof changes to such a leading value prior to the generator actually falling out of step, as to cause the out-of-step relay 23 to open immediately its contacts 22 and effect the deenergization of the closing coil 20 of the field switch so that the field winding 13 is disconnected from the source of excitation 16 and the discharge resistor 14 is connected across the terminals of the field winding 13, thereby causing the generator to operate as an induction generator driven by the prime mover 2. The opening of the auxiliary contacts 49 on the field switch 15 deenergizes the governor magnet 9 so that the closing spring 7 is operative to move the movable member 6 of the governor 4 toward its closed position thereby effecting the closing of the gate 5 and a decrease in the speed of the generator 1 so as to restore it back toward its normal no-load speed. The closing of the contacts 41 on the field switch 15 completes the energizing circuit of the control relay 18 in the manner heretofore described, but the closing of the contacts 42 of the relay 18 at this time does not complete an energizing circuit for the closing coil 20 because this energizing circuit is now open at the contacts 43 of the control relay 44. The opening of the auxiliary contacts 34 and the closing of the auxiliary contacts 50 on the field switch 15, when it is opened, change the connections of the windings 27 and 31 of the out-of-step relay 23 so that when the slip of the generator 1 decreases below a predetermined value, the contacts 22 remain closed for a sufficient length of time during each slip cycle to maintain the circuit of the time relay 19 energized through the auxiliary contacts 45 on the field switch 15 and the contacts of the control relay 18 long enough to cause the relay 19 to close its contacts 46 and complete the heretofore described energizing circuit for the closing coil 20. The closing of the field switch 15 then effects in a manner heretofore described the resynchronization of the generator 1 and the reenergization of the governor magnet 9 so as to restore normal operation of the prime mover driven generator 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a synchronous generator connected to an alternating current system, a prime mover driving said generator, means responsive to an out-of-step condition of said generator for removing excitation from said generator and for shutting off the supply of driving energy to said prime mover while maintaining said generator connected to the alternating current system, and means responsive to a predetermined armature circuit condition of said generator while it is connected to said system with its excitation removed for restoring excitation to said generator and for increasing the supply of driving energy to said prime mover.

2. In combination, a synchronous generator connected to an alternating current system, a prime mover driving said generator, means for shutting off the supply of driving energy to said prime mover, means responsive to an out-of-step condition of said generator for removing excitation from said generator and for initiating said shutting off means while maintaining said generator connected to the alternating current system, and means responsive to a predetermined armature circuit condition of said generator while it is connected to said system with its excitation removed for restoring excitation to said generator and for rendering said shutting off means inoperative to shut off the supply of driving energy to said prime mover.

3. In combination, a synchronous generator connected to an alternating current system, a prime mover driving said generator, means responsive to an out-of-step condition of said generator for removing excitation from said generator and for shutting off the supply of driving energy to said prime mover while maintaining said generator connected to the alternating current system, and means responsive to the slip of said generator decreasing below a predetermined value for restoring excitation to said generator and for increasing the supply of driving energy to said prime mover.

4. In combination, a synchronous generator connected to an alternating current system, a prime mover driving said generator, means for shutting off the supply of driving energy to said prime mover, a source of excitation, a field switch connecting said source to the field winding of said generator, means responsive to an out-of-step condition of said generator for effecting the opening of said field switch and the initiation of the operation of said shutting off means, and means responsive to the slip of said generator decreasing below a predetermined value for reclosing said field switch and rendering said shutting off means inoperative to shut off the supply of driving energy to said prime mover.

5. In combination, a synchronous generator connected to an alternating current system, a prime mover driving said generator, means for shutting off the supply of driving energy to said prime mover, a source of excitation, a field switch connecting said source to the field winding of said generator, means responsive to an out-of-step condition of said generator for effecting the opening of said field switch, and means responsive to the opening of said switch for initiating the operation of said shutting off means.

6. In combination, a synchronous generator connected to an alternating current system, a prime mover driving said generator, means for shutting off the supply of driving energy to said prime mover, a source of excitation, a field switch connecting said source to the field winding of said generator, means responsive to an out-of-step condition of said generator for effecting the opening of said field switch, means responsive to the opening of said switch for initiating the operation of said shutting off means, and means responsive to the slip of said generator decreasing below a predetermined value for reclosing said field switch and rendering said shutting off means inoperative to shut off the supply of driving energy to said prime mover.

7. In combination, a synchronous generator connected to an alternating current system, a prime mover driving said generator, means responsive to a predetermined armature circuit condition of said generator indicative that said generator is about to fall out of step for removing excitation from said generator and for shutting off the supply of driving energy to said prime mover while maintaining said generator connected to the alternating current system, and means responsive to a predetermined armature circuit condition of said generator while it is connected to said system with its excitation removed for restoring excitation to said generator and for increasing the supply of driving energy to said prime mover.

8. In combination, an alternating current circuit, a synchronous machine having an armature winding and a field winding, a circuit breaker for connecting the armature winding of said machine to said circuit, a source of excitation, a field switch for connecting said source to the field winding of said machine, means for closing said field switch while said circuit breaker is open, means for opening said field switch while said circuit breaker remains closed, and means dependent upon a predetermined speed condition of said machine for reclosing said field switch while said circuit breaker is closed.

9. In combination, an alternating current circuit, a synchronous machine having an armature winding and a field winding, a circuit breaker connecting said armature winding to said circuit, a source of excitation, a field switch connecting said source to said field winding, a control switch, means responsive to a predetermined electric condition of said machine for effecting the opening of said field switch while said circuit breaker remains closed, means dependent upon a predetermined speed condition of said machine for reclosing said field switch while said circuit breaker is closed and said control switch is in a predetermined position, and means for closing said field switch independently of said predetermined speed condition when said circuit breaker is open and said control switch is in said predetermined position.

HERMAN BANY.